United States Patent [19]

Lindemann et al.

[11] 3,778,620

[45] Dec. 11, 1973

[54] SQUARE WAVE ROTARY PULSE TRANSDUCER

[75] Inventors: Robert W. Lindemann; John W. Parmley, both of Watertown, Wis.

[73] Assignee: Cutler-Hammer Inc., Milwaukee, Wis.

[22] Filed: Apr. 24, 1972

[21] Appl. No.: 246,803

[52] U.S. Cl. .................................. 250/232, 250/233

[51] Int. Cl. .................................................. G01d 5/36

[58] Field of Search .............. 250/233, 232, 231 SE, 250/229

[56] References Cited

UNITED STATES PATENTS 2,475,600 7/1949 Eytinge .............................. 250/229

OTHER PUBLICATIONS

Dennett, R.D., Manual Control with Arbitrary Output Voltage, IBM Technical Disclosure Bulletin Vol. 14, No. 8, Jan. 1972.

*Primary Examiner*—James W. Lawrence
*Assistant Examiner*—T. N. Grigsby
*Attorney*—Hugh R. Rather et al.

[57] ABSTRACT

An electro-optical pulse generator. A disc having alternate transparent and opaque areas at its periphery is rotated between a light emitting diode (LED) and a photo-transistor to generate pulses. In order to avoid generation of spurious pulses in the event of slight rotation due to vibration or the like causing shifting across the opaque-to-transparent tripping point, gray (semi-transparent) areas are interposed on this disc between the transparent and opaque areas. These gray areas will not cause tripping and, thus, lengthen the angular distance between the high (transparent) tripping point and the low (opaque) tripping point to prevent unwanted pulses.

8 Claims, 8 Drawing Figures

SQUARE WAVE ROTARY PULSE TRANSDUCER

BACKGROUND OF THE INVENTION

Optical pulse generators have been known heretofore. The usual practice has been to provide a disc with alternate transparent and opaque areas and to rotate this disc in a light beam between a light source such as an electric bulb and a light pickup such as a photocell. The light beam impinging on the photocell causes an electric current to be produced and the opaque areas interrupt this light beam thereby causing the generation of square wave electric pulses.

The invention relates to improvements thereover.

SUMMARY OF THE INVENTION

This invention relates to an electro-optical pulse generator.

An object of the invention is to provide an improved square wave rotary pulse generator.

A more specific object of the invention is to provide an improved electro-optical pulse generator that prevents spurious pulses due to backup, vibration or other mechanical motion not readily avoidable.

Another specific object of the invention is to provide a square wave rotary pulse transducer with improved means lengthening the angular distance between high and low trip points thereby to avoid unwanted pulses that would otherwise be caused by unavoidable mechanical motion after stopping.

Another object of the invention is to provide an improved pulse generator of the aforementioned type in a simple and economical manner.

Other objects and advantages of the invention will hereinafter appear.

DESCRIPTION OF THE PREFERRED EMBODIMENT

Figure 1:
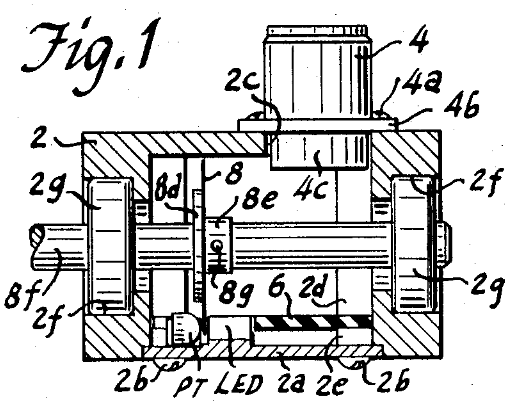
FIG. 1 is a cross-sectional view of a square wave rotary pulse generator taken along line 1—1 of FIG. 2.

Referring to FIG. 1, there is shown a square wave rotary pulse transducer constructed in accordance with the invention. This pulse transducer comprises a housing 2, an electrical connector 4, a PC (printed circuit) board assembly 6, and a rotary disc assembly 8.

Figure 2:
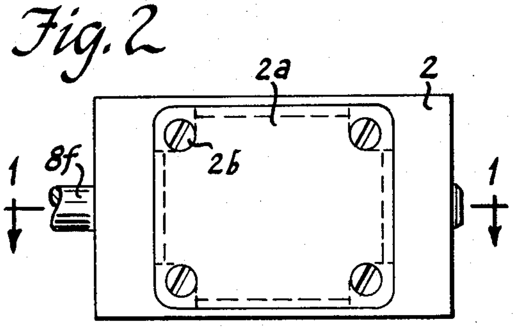
FIG. 2 is a bottom view of the pulse generator of FIG. 1.

Housing 2 comprises a generally rectangular enclosure of metal or the like having a rectangular opening at the bottom closed by a cover **2*a*. As shown in the bottom view in FIG. 2, this cover may be secured to the housing by four screws 2*b*, one at each corner thereof, or the like. At the upper right-hand portion of the housing there is provided an aperture 2*c* into which is mounted an electrical connector 4 and secured therein by a plurality of screws 4*a* extending through its flange 4*b*. As shown in FIG. 1, this connector comprises an internal portion 4*c* extending from the flange through aperture 2*c* into the housing, and an external portion 4** extending upwardly from the flange. As will be apparent the electrical conductors within the housing may be connected to, or plugged into, the internal portion of the connector and electrical conductors of an external circuit may be plugged into the external portion thereof. In this manner, the several wires within the housing are connected to respective wires outside the housing as hereinafter more fully described.

Housing 2 also comprises means for supporting PC board assembly 6 in a fixed position. This means comprises a protrusion **2*d* extending down along each of the four vertical corners of the compartment within the housing. These protrusions extend down into predetermined spaced relation with the bottom of the housing to provide a stop against which PC board 6 is clamped at its corners by similar protrusions 2*e* on cover 2*a* as shown in FIG. 1.**

Housing 2 further comprises means for supporting rotary shaft assembly 8. This means comprises a recess **2*f* at each end of the housing into each of which is mounted a bearing 2*g* such as a ball bearing or the like for rotatably supporting the shaft of disc assembly 8. A hole extends from each of these recesses into the compartment within the housing to freely accommodoate the shaft of the disc assembly as shown in FIG. 1.**

Figure 4:
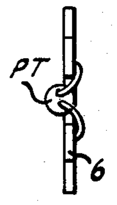
FIG. 4 is a right end view of the PC board assembly of FIG. 3.
Figure 3:
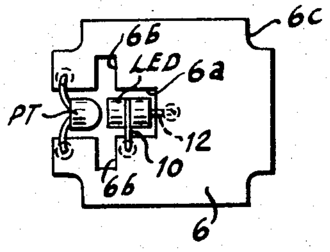
FIG. 3 is a top view of the printed circuit (PC) board assembly used in the pulse generator of FIG. 1.

As shown in FIGS. 3 and 4, the PC board assembly comprises means for mounting a light source such as an LED (light emitting diode) and a light responsive current generator such as a photo-transistor PT, and for making electrical connections thereto. This means comprises a slot **6*a* in the left-hand end of PC board 6. The LED is mounted at the right-hand portion of this slot by soldering its two electrical wires to the PC board, including a first wire 10 connecting the sleeve of the LED and a second wire 12 connecting the LED element to conductors on the PC board as shown in FIG. 3.**

Photo-transistor PT is similarly mounted near the left-hand portion of the slot by soldering its two wires to conductors on the PC board on opposite sides of the slot as shown in FIG. 3. The photo-transistor is spaced from the LED sufficiently to provide space for the disc to rotate therebetween as hereinafter described. Slot **6*a* in the PC board is provided with a pair of lateral notches 6*b* to provide clearance for rotary disc 8. The PC board is provided with notches 6*c* at its four corners to provide clearance for screws 2*b*, with the edges of these notches being clamped between the protrusions on the housing and cover. Wires from the conductors at another part of the PC board may extend to connector portion 4*c*** to connect diode LED and pickup PT to an external circuit, these wires not being shown.

Figure 5:
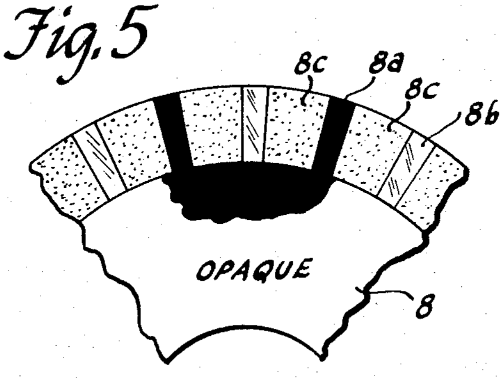
FIG. 5 is an enlarged fragmentary view of the rotary disc used in the pulse generator of FIG. 1.

The rotary disc assembly comprises a flat disc 8 of "mylar" or the like onto the peripheral area of which has been formed alternate opaque and transparent areas or strips **8*a* and 8*b*, respectively, separated by semi-transparent strips or areas 8*c* as shown in FIG. 5.**

This disc is mounted on a flange 8*d* of a bushing 8*e* as by gluing, cementing, or the like. This bushing is slid onto shaft 8*f* and rigidly secured thereto as by a pin 8*g* or the like. When this shaft is mounted in bearings 2*g* in the housing, the peripheral edge portion of this disc extends down between the light source LED and the light pickup PT so as to control the light beam therebetween.

These light (transparent) and dark (opaque) and shade (semi-transparent) areas may be formed by any known process so that the light area transmits 95 percent or more of the incident light, the shade area transmits 50 percent plus or minus 15 percent of the incident light, and the dark area transmits 5 percent or less of the incident light as shown in FIG. 5. These light and dark areas may be narrower than that shown in FIG. 5 depending upon the width of the light beam between the light source and light pickup and the total number of pulses required per revolution of the disc. As an example, for twelve pulses per revolution, the light and dark areas may each be 4.5 degrees wide and the shade area may be 10.5 degrees wide. This provides 30 degrees (light area, shade area, dark area, shade area) for each pulse and 360 degrees for twelve pulses.

Figure 6:
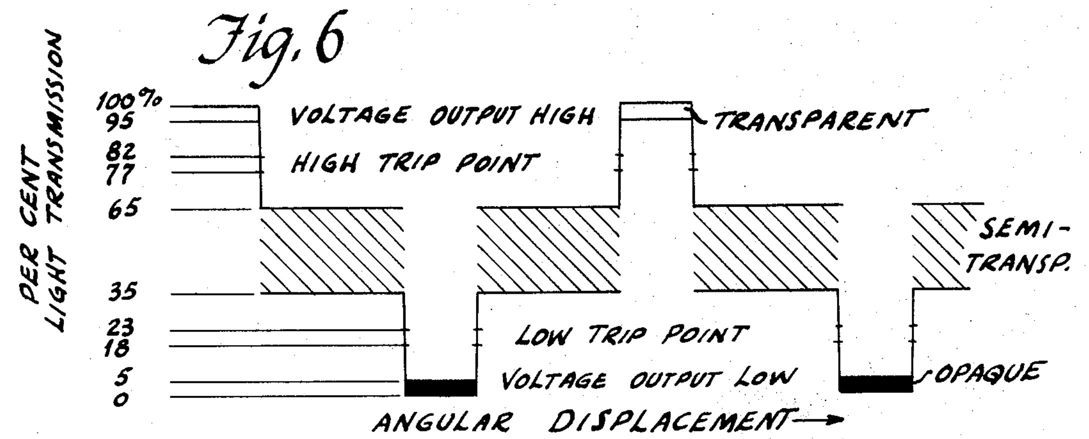
FIG. 6 is a graph showing operating characteristics of the pulse generator of FIGS. 1-5 in terms of percent light transmission and angular displacement.

The light emitting diode and/or the photo-transistor may be connected into a tripping circuit of the feedback amplifier type or the like that trips to high output voltage at 77 to 82 percent light transmission as shown in FIG. 6 and trips to low output voltage at 23 to 18 percent light transmission.

Assuming that a shade area is in the light beam to start with and that the disc is rotated clockwise as seen in FIG. 5, as the leading edge of a light area comes into the light beam, the phototransistor will trip to a high output voltage at the high trip point as shown in FIG. 6. This high output voltage will remain until the next dark area reaches the light beam. The intervening shade (or gray) area will not cause tripping of the phototransistor. When this next dark area reaches the light beam, the photo-transistor will trip to low output voltage.

Figure 8:
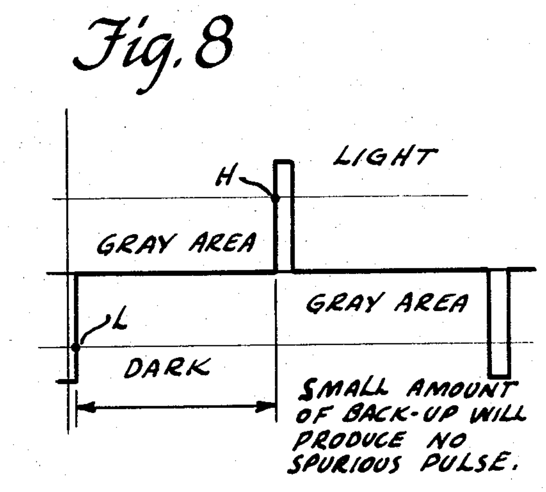
FIG. 8 is a graph showing operating characteristics of the pulse generator of FIGS. 1-5 including the relatively wide separation of high and low trip points with respect to angular displacement.

Assuming that the disc is stopped immediately beyond high tripping point H, as shown in FIG. 8, it will be apparent that should it back up slightly, it will not reach low tripping point L. Thus, the invention effectively prevents spurious pulse generation.

Figure 7:
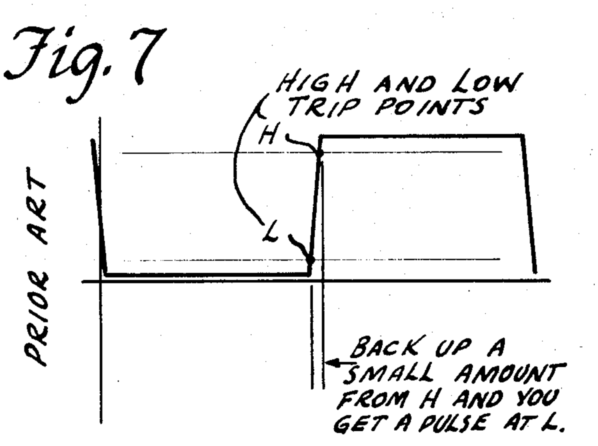
FIG. 7 is a graph showing operating characteristics of a prior art pulse generator including the closeness of the high and low trip points with respect to angular displacement.

In the prior art on the other hand, as shown in FIG. 7, the high and low trip points H and L are close together. A small amount of backup from point H might cause tripping to low voltage output at point L, producing an unwanted pulse.

The aforementioned introduction of the shade areas separates the high and low tripping points according to the invention.

While the apparatus hereinbefore described is effectively adapted to fulfill the objects stated, it is to be understood that the invention is not intended to be confined to the particular preferred embodiment of square wave rotary pulse transducer disclosed, inasmuch as it is susceptible of various modifications without departing from the scope of the appended claims.

We claim:

1. An electro-optical pulse generator comprising:

a housing;

a light responsive means in said housing operable to produce an electric signal;

a light source emitting a light beam impinging on said light responsive means to cause the latter to produce said electric signal;

means responsive to said signal for providing an output voltage;

and a movable light control member between said light source and said light responsive means and having adjacent areas of different light transmitting quality arranged in the direction of its motion including transparent areas which upon reaching the light beam cause the output voltage to trip to high value, opaque areas which upon reaching the light beam cause the output voltage to trip to low value, and semitransparent areas between said transparent and opaque areas that do not cause any change in the output voltage value thereby to prevent spurious output pulses in the event of slight shifting when said member is stopped at or near the boundary of a transparent of opaque area.

2. The invention defined in claim 1, wherein said light source is a light emitting diode;

and said light responsive means is a photo-transistor.

3. The invention defined in claim 1, wherein said movable light control member comprises:

a flat disc having said transparent, opaque and semi-transparent areas arranged around its periphery;

a shaft on which said disc is mounted so that its periphery rotates in said light beam;

and means for continuous 360 degree mounting said shaft for rotation in said housing.

4. The invention defined in claim 1, wherein:

said transparent areas transmit 95 percent or more of the light;

said opaque areas transmit 5 percent or less of the light;

and said semi-transparent areas transmit 35 to 65 percent of the light.

5. The invention defined in claim 4, wherein:

said output voltage means trips to high voltage value in response to 77 to 82 percent light transmission;

and said output voltage means trips to low voltage value in response to 23 to 18 percent light transmission.

6. The invention defined in claim 1, wherein said light responsive means and said light source comprise:

a photo-transistor and a light emitting diode mounted in spaced apart relation on a printed circuit board to provide space therebetween for passage of said movable light control member;

and means for clamping said printed circuit board in fixed position within said housing.

7. An electro-optical pulse generator comprising:

a housing having a cover;

a printed circuit board clamped in said housing by said cover;

a light source and a light responsive element mounted on said printed circuit board in spaced apart relation so that the light beam from said light source normally impinges on said light responsive element;

an electrical connector mounted on said housing;

means connecting said light source and said light responsive element through said printed circuit board and said electrical connector to an external trip circuit for providing an output voltage;

a rotary shaft journaled in said housing;

a disc mounted on said rotary shaft so that its peripheral portion moves in said light beam;
transparent and opaque areas on said peripheral portion for interrupting said light beam as said disc rotates to cause tripping of said external circuit to provide a square wave voltage output;
and semi-transparent areas between said transparent and opaque areas that increase the angular distance between the high and low voltage trip points to prevent generation of spurious pulses in the event of slight motion after stopping of said disc.

8. The invention defined in claim 7, wherein:
said transparent areas pass almost all of the light;
said opaque areas block almost all of the light;
and said semi-transparent areas pass about 50 percent of the light and more or less but not enough more or less to reach the high and low trip points of said circuit.

* * * * *